United States Patent [19]

Torii et al.

[11] Patent Number: 4,859,139
[45] Date of Patent: Aug. 22, 1989

[54] ARM STRUCTURE FOR AN INDUSTRIAL ROBOT

[75] Inventors: Nobutoshi Torii, Hachioji; Ryo Nihei, Musashino; Akihiro Terada, Hino, all of Japan

[73] Assignee: Fanuc Ltd., Yamanashi, Japan

[21] Appl. No.: 162,387

[22] PCT Filed: Jun. 3, 1987

[86] PCT No.: PCT/JP87/00352
§ 371 Date: Feb. 1, 1988
§ 102(e) Date: Feb. 1, 1988

[87] PCT Pub. No.: WO87/07554
PCT Pub. Date: Dec. 17, 1987

[30] Foreign Application Priority Data
Jun. 3, 1986 [JP] Japan .................................. 61-127215

[51] Int. Cl.⁴ .............................................. B25J 18/00
[52] U.S. Cl. .................................. 414/744.5; 74/469; 74/479; 414/719; 901/27; 901/48
[58] Field of Search ................... 414/744, 719; 901/15, 901/48, 27; 74/469, 479

[56] References Cited
U.S. PATENT DOCUMENTS 3,731,820  5/1973  Niki et al. ........................... 901/27 X
4,530,062  7/1985  Inaba et al. ........................ 901/48 X Primary Examiner—Frank E. Werner
Assistant Examiner—Donald W. Underwood
Attorney, Agent, or Firm—Armstrong, Nikaido, Marmelstein, Kubovcik & Murray

[57] ABSTRACT

An arm structure for an industrial robot, comprising a first robot arm (16) supported on top of a vertical robot shaft (14), and a second robot arm (20) pivotally joined through a transmission-reduction gear box (18) to the free end of the first robot arm (16). A plurality of coupling bolts (22) are extended through the interior of the first robot arm (16), each coupling bolt (22) has one end (22b) fastened to the flange (18b) of the transmission-reduction gear box (18) and the other end (22a) projecting from and fastened to the rear end of the first robot arm (16). Fastening nuts (24) each engage at least one end (22a or 22b) of each coupling bolt (22) to couple the first robot arm (16) and the transmission-reduction gear box (18) so as to preload the first robot arm (16) by a compressive force.

6 Claims, 1 Drawing Sheet

ARM STRUCTURE FOR AN INDUSTRIAL ROBOT

DESCRIPTION

1. Technical Field

The present invention relates generally to an arm structure for the movable unit of an industrial robot and, more particularly, to an industrial robot comprising an effective and inexpensive mechanism for improving the load capacity of the arm structure thereof in conveying a weight such as a workpiece held by a robot hand attached to the extremity of the arm structure or in executing robot work in a loaded state with a tool held by the robot hand.

2. Background Art

In a horizontal multi-articulate type robot applied to precision assembling work, in particular, among the recent industrial robots used for industrial purposes, movable robot units, such as a vertical shaft capable of vertically movement relative to a robot base unit, a horizontal robot upper arm and a horizontal robot forearm, are formed in hollow component structures, and drive sources for driving the shaft, the horizontal arms and a robot wrist attached to the extremity of the horizontal arm, transmission mechanisms, reduction gear mechanisms, wiring and piping are housed within the hollow component structures to prevent the horizontal articulated robot from generating dust and oil during operation.

However, when handling a weight such as a workpiece with a robot hand or a tool attached to the extremity of a wrist, a tensile load and a bending load act inevitably on the robot arms, and the influence of the tensile and bending loads on the robot arms formed in hollow structures is more significant than on robot arms formed in rigid structures. This influence on the robot arms cannot be entirely disregarded when the horizontal articulated robot is applied to precision assembling work.

DISCLOSURE OF THE INVENTION

Accordingly, an object of the present invention is to provide an arm structure for an industrial robot, capable of mitigating the influence of a load acting as the above-mentioned tensile load and bending load. Another object of the present invention is to provide a horizontal multi-articulate type industrial robot having a light weight and able to resist the tensile and bending loads.

In accordance with the present invention, there is provided an industrial robot comprising a vertical robot shaft, a first robot arm attached to the upper end of the vertical robot shaft, transmission-reduction gear means fixedly provided on the free end of the first robot arm and contained in a case, a second robot arm pivotally joined to the free end of the first robot arm, a plurality of coupling bolt means each penetrating through the interior of the first robot arm, and having one end fixed to the case containing the transmission-reduction gear means and the other end projecting from and fixed to the rear end of the first robot arm, and fastening nut means each engaging at least one end of each of the coupling bolt means, wherein a compressive force is applied beforehand to the first robot arm when coupling the transmission-reduction gear means with the first robot arm.

BRIEF DESCRIPTION OF THE DRAWINGS

The above and other objects and advantages of the present invention will be described in detail hereinafter with reference to a preferred embodiment thereof illustrated in the accompanying drawings.

BEST MODE FOR CARRYING OUT THE INVENTION

Figure 1:
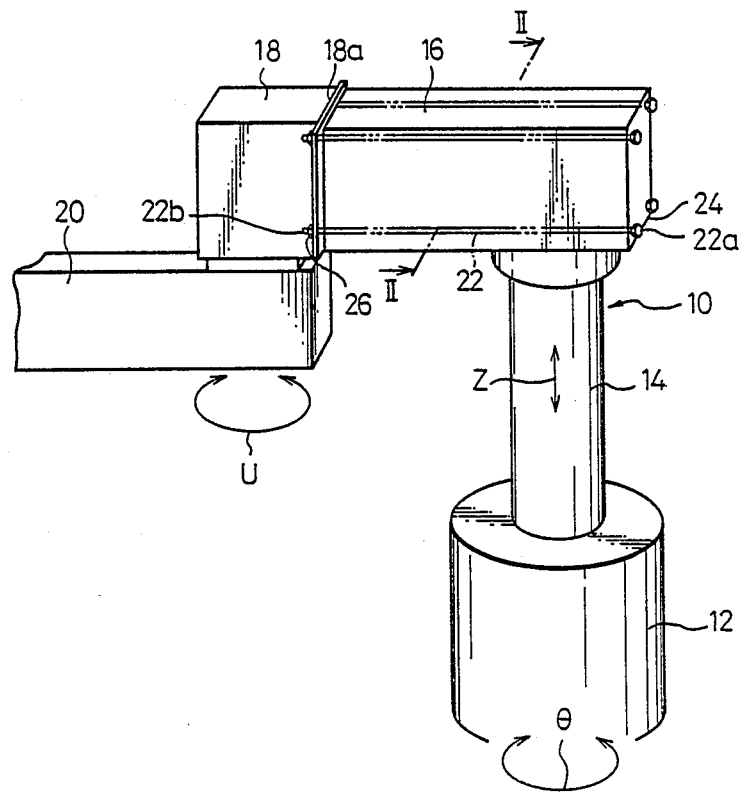
FIG. 1 is a fragmentary perspective view of a horizontal multi-articulate type industrial robot incorporating an arm structure, in a preferred embodiment according to the present invention.
Figure 2:
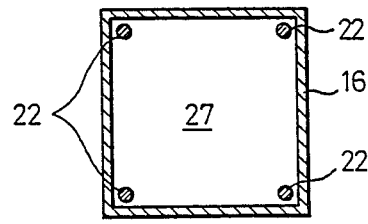
FIG. 2 is a sectional view taken along the line II—II in FIG. 1.

Referring to FIGS. 1 and 2 showing the essential portion of a horizontal articulated industrial robot incorporating an arm structure according to the present invention, the industrial robot 10 has a swiveling body 12. The swiveling body 12 is a component capable of swiveling about a vertical axis relative to a bed, not shown, in directions indicated by double-headed arrow $\theta$. A vertical shaft 14 is mounted for vertical movement in directions indicated by a double-headed arrow Z on the swiveling body 12. A first arm 16 included in a horizontal robot arm structure is attached to the top of the vertical shaft 14 so as to extend horizontally to the front. A transmission-reduction gear box 18 comprising a transmission-reduction gear and a case containing the transmission-reduction gear is attached to the free end of the first arm 16. A second arm 20 included in the horizontal arm structure is attached to the lower part of the transmission-reduction gear box 18 for a turning motion in a horizontal plane about a vertical axis in directions indicated by a double-headed arrow U so as to extend horizontally similarly to the first arm 16. Although not shown in the drawings, ordinarily a robot wrist is provided on the free end of the second arm 20 for handling various loads through robot actions. A motor, not shown, for the turning motion of the second arm 20 is housed in the first arm 16. The output of the motor is transmitted through the transmission-reduction gear, not shown, contained in the transmission-reduction gear box 18 and including, for example, a skew gear mechanism for the second arm 20, to drive the second arm 20 for a turning motion within a horizontal plane.

According to the present invention, the transmission-reduction gear box 18 is joined to the free end of the first arm 16 with a plurality of elongated coupling bolts 22, and each coupling bolt 22 has one end 22a projecting from the rear end of the first arm 16 and fastened to the rear end of the first arm 16 with a fastening nut 24, and the other end projecting to the front from an appropriate flange 18a formed in the end surface of the transmission-reduction gear box 18 and fixed to the front face of the flange 18a with a fastening nut 26.

That is, the elongated coupling bolts 22 are extended through the interior of the first arm 16 and the respective opposite ends of the elongated coupling bolts 22 are fastened to the opposite ends of the first arm 16 to preload the first arm 16 by applying a compressive force beforehand to the first arm 16. Accordingly, when the robot 10 holds a load by means of the robot wrist provided on the free end of the second arm 20 for robot actions, and thereby the long first arm 16 is subjected to a tensile force and a bending moment caused by the load, the compressive force applied beforehand to the first arm 16 suppresses the influence of the tensile force and the bending moment on the first arm 16. When a component similar to the transmission-reduction gear box 18 is provided on the extremity of the second arm 20, the second arm 20 may be provided with the same construction for preloading the second arm 20 by applying a compressive force to the second arm 20 as that for applying beforehand the compressive force to the first arm 16, to effect both coupling such a component to the second arm 20 and preloading the second arm 20 by a compressive force.

Although the coupling bolts 22 provided on the first arm 16, in the embodiment described hereinbefore, are fastened at the respective opposite ends thereof to the first arm 16 with the fastening nuts 24 and 26, respectively, each coupling bolt 22 may be provided with a bolt head at one of the opposite ends 22a and 22b thereof and may be fastened to the first arm 16 at the other end with the fastening nut 24 or 26. Furthermore, when the first arm 16 has a rectangular cross section, it is preferable to extend the coupling bolts 22 respectively along the four internal corners and contiguously with the internal wall surfaces of the first arm 16 as shown in FIG. 2 to secure sufficient internal space 27 for wiring and piping to enable the application of a sufficient longitudinal compressive force to the first arm 16. Still further, when the first arm 16 has a circular cross section, it is desirable to arrange the plurality of coupling bolts 22 along the internal circumference of the first arm 16 at regular angular intervals.

As apparent from the foregoing description, the arm structure of an industrial robot according to the present invention employs elongated coupling bolts for attaching a transmission-reduction gear box to one end of an arm, and the coupling bolts are extended through the interior of the arm and are fastened to the arm so as to preload the arm by a compressive force. Therefore, the influence of a tensile force and bending moment caused by a load on the arm can be satisfactorily reduced. Naturally, the present invention is also applicable to the respective arms of other articulated type industrial robots, not to mention the horizontal multi-articulated type industrial robot as specifically described herein with reference to the preferred embodiment thereof.

We claim:

1. An industrial robot comprising: a vertical robot shaft; a first robot arm secured to an upper end of said vertical robot shaft; transmission-reduction gear means secured to a free end of said first robot arm and contained in a case; a second robot arm pivotally joined through said transmission-reduction gear means to the free end of said first robot arm; a plurality of coupling bolts, each bolt extending through the interior of said first robot arm and having one end securing said case containing said transmission-reduction gear means to said first robot arm and the other end projecting from and fastened to a rear end of said first robot arm; and a fastening nut engaging at least one end of each of said coupling bolts, wherein said nuts are tightened on said bolts to couple said transmission-reduction gear means to said first robot arm and compress said first arm.

2. An industrial robot according to claim 1, wherein said fastening nuts are fastened to said coupling bolt means at the rear end of said first robot arm.

3. An industrial robot according to claim 1, wherein said first robot arm is comprised of a hollow structure having a rectangular cross section.

4. An industrial robot according to claim 3, wherein said plurality of coupling bolts comprise four elongated bolts, and said four bolts extend through said first robot arm respectively along four corners of said first robot arm.

5. An industrial robot according to claim 1, wherein said first robot arm is formed in a hollow structure having a circular cross section, and said plurality of coupling bolt means are equiangularly arranged along the circumference of a wall of said first robot arm.

6. An industrial robot according to claim 1, wherein said first and second arms are horizontal articulated arms disposed in a horizontal position relative to said vertical axis.

* * * * *